United States Patent [19]

Baird et al.

[11] 4,275,932
[45] Jun. 30, 1981

[54] NON-FRANGIBLE WHEEL

[75] Inventors: Roy W. Baird, Uniontown; Robert E. Berger; Richard L. Kirk, both of North Canton, all of Ohio

[73] Assignee: Goodyear Aerospace Corporation, Akron, Ohio

[21] Appl. No.: 46,891

[22] Filed: Jun. 8, 1979

[51] Int. Cl.$^3$ .................. B60B 21/00; B64C 25/32
[52] U.S. Cl. .................. 301/39 T; 301/97; 244/103 R
[58] Field of Search .................. 152/378, 379.3, 381.4; 301/6 A, 39 R, 39 T, 39 C, 38 R, 95–97; 244/103 R

[56] References Cited

U.S. PATENT DOCUMENTS

| 2,115,092 | 4/1938 | Weinberg | 152/381.3 X |
| 3,155,429 | 11/1964 | Metzler | 301/39 T X |
| 3,430,896 | 3/1969 | Labrecque | 244/103 R |

FOREIGN PATENT DOCUMENTS 676062  7/1952  United Kingdom .................. 301/96

*Primary Examiner*—Charles A. Marmor
*Attorney, Agent, or Firm*—P. E. Milliken; L. A. Germain

[57] ABSTRACT

An improved aircraft wheel configuration obviates the hazard of wheel failure during take-off and landing situations when tire deflation occurs and the wheel accepts full loading on its flanges. The wheel is configured to provide a differential flange height between the inboard and outboard flanges such that the total load applied to the wheel is distributed equally between the flanges. Alternatively, and/or in addition the flanges are restructured to provide an increased section modulus and the inboard flange is designed to provide a wider contact surface.

14 Claims, 3 Drawing Figures

NON-FRANGIBLE WHEEL

BACKGROUND OF THE INVENTION

This invention generally relates to vehicle wheels and more particularly to aircraft wheel configurations that increase the safety integrity of a wheel upon deflation of the mounted tire when rolling at high speed on a runway surface.

When a tire fails in a take-off or landing situation, the mating tire of a pair may also fail due to the increased and sometimes excessive loading to which it is subjected. When this happens, and the aircraft is moving at a high rate of speed, the tire carcasses eventually disentegrate resulting in the wheel flanges bearing directly against the surface of the runway. This situation has led to breakup of the wheels with parts being ingested into the engines and/or causing airframe damage and thus substantially increasing the hazard and possible loss of the aircraft.

In tests simulating a flat tire on an aircraft such as a Douglas DC-10, it was determined that when a cantilever-mounted wheel rolls without a tire, the inboard flange carries a major portion of the applied load. This is due to axle and/or wheel deflection, wheel stiffness, and/or the general wheel configuration. It was further determined that in an emergency involving a deflated tire, a wheel should be capable of rolling at least 3 kilometers (9,534 feet) without failure while carrying an applied load of approximately 0.95 percent of the maximum static load on the wheel resulting from maximum aircraft gross weight. For example, in the case of a Douglas DC-10 Series 30/40 aircraft, a wheel load of 57,000 lbs. may be experienced by a forged aluminum wheel weighing 212 lbs. It is imperative therefore, in an emergency situation, that each of the mounted wheels be capable of carrying the load irrespective of the inflated or deflated condition of a respective tire. This invention therefore, involves design analysis related to stress distribution in the wheel structure and deflection in the wheel and axle. These must be integrated with distribution of forces on the flanges such that the very low cycle fatigue endurance is balanced carefully between the two flanges.

It is the purpose of this invention to provide an aircraft wheel configuration that obviates the hazard of wheel fracture by providing greater structural integrity in the wheel without excessive additional weight. This allows the wheel to roll a substantially greater distance on the runway without breaking up. In this circumstance, an aircraft may come to a controlled stop even though the tires are deflated and it is rolling on the wheel flanges. In accordance with one aspect of the invention, an improved aircraft wheel is characterized by a differential flange height between the inboard and outboard flanges such that an increased outboard flange height exists to provide a substantially even distribution of the loading on the wheel flanges upon deflation of the mounted tire.

Various other objects and advantages of the invention will become evident from the description that follows when considered in conjunction with the accompanying drawings in the several figures in which like parts bear like reference numerals.

DESCRIPTION OF THE INVENTION

Figure 1:
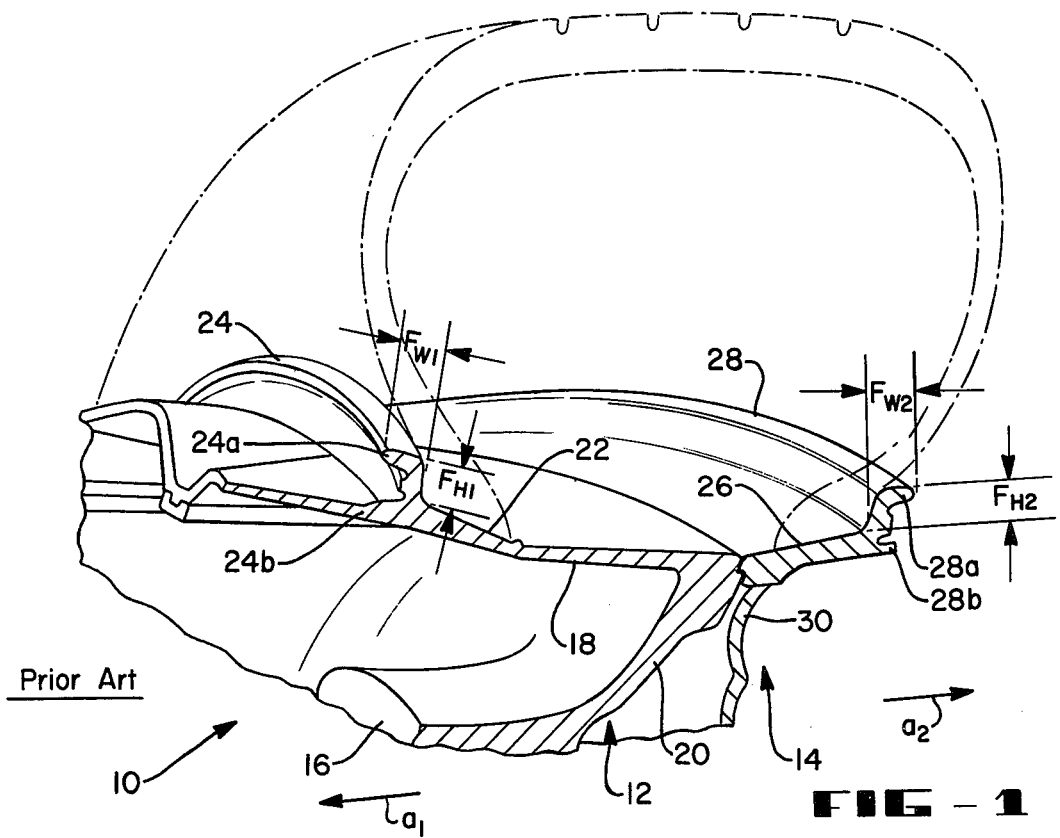
FIG. 1 is a partial perspective view, in section, illustrating a typical aircraft wheel and its mounted tire shown in ghost lines.

In the drawings, FIG. 1 illustrates a typical aircraft tire (shown in ghost lines) mounted on a wheel generally indicated by reference numeral 10. Conventionally, but not necessarily, the wheel 10 is a two-part construction comprised of an inboard section 12 and an outboard section 14, the two sections being fastened together by bolts or other fastening means to form the total wheel structure. For the sake of clarity in the drawing, various parts of the wheel such as, for example, the means for fastening the two wheel sections 12 and 14 together and other details which do not affect the scope of the invention, are not illustrated. Further and for the purpose of this description, the inboard and outboard directions are with respect to the wheel axle mounting on the aircraft landing gear strut as shown by the arrows $a_1$ and $a_2$. The strut mounts a carriage assembly for multiple wheels in the well known and understood manner.

The inboard section 12 of the wheel 10 typically comprises a hub 16 for mounting on an axle/bearing assembly (not shown) and interconnected to what is known in the art as the "wheel tubewell" 18 through a web structure 20. FIG. 1 is taken from the inboard side of the wheel 10 and, therefore, the tubewell 18 terminates in an inboard tire bead seat 22 and flange 24. The flange 24 may take on various configurations, the one shown having an upper flange rib 24a and an outrigger rib 24b and characterized by a flange height $F_{H1}$ and width $F_{w1}$.

Similarly, the outboard wheel section 14 also comprises a tire bead seat portion 26 terminating in an outboard flange 28 having a flange height $F_{H2}$ and width $F_{w2}$. The bead seat portion 26 terminates at the inboard end in a web 30 that will attach to the web 20 of wheel section 12, the webs 20,30 having provision for fastening the two wheel sections together into an integral pressure-sealed structure. Of course it is anticipated that the wheel may also be a one-piece structure and in this case the web portions 20,30 will comprise a singular web.

Now therefore, and as herebefore stated, when a mounted tire fails and runs at high speed in a deflated condition, it tends to disentegrate by the action of the wheel flanges on the surface of the runway. In this condition, the load carried by the wheel is substantially carried by the inboard flange 24 due to flexing of the wheel and the strut-mounted axle.

Figure 2:
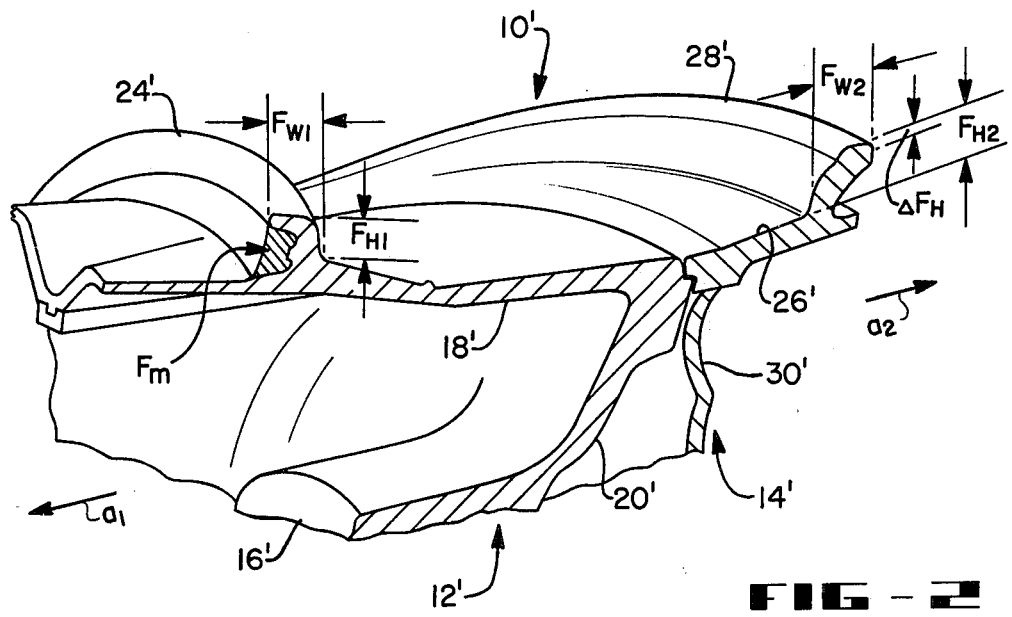
FIG. 2 is a partial perspective view of an aircraft wheel illustrating modified inboard and outboard flange configurations that meet the objectives of the invention.
Figure 3:
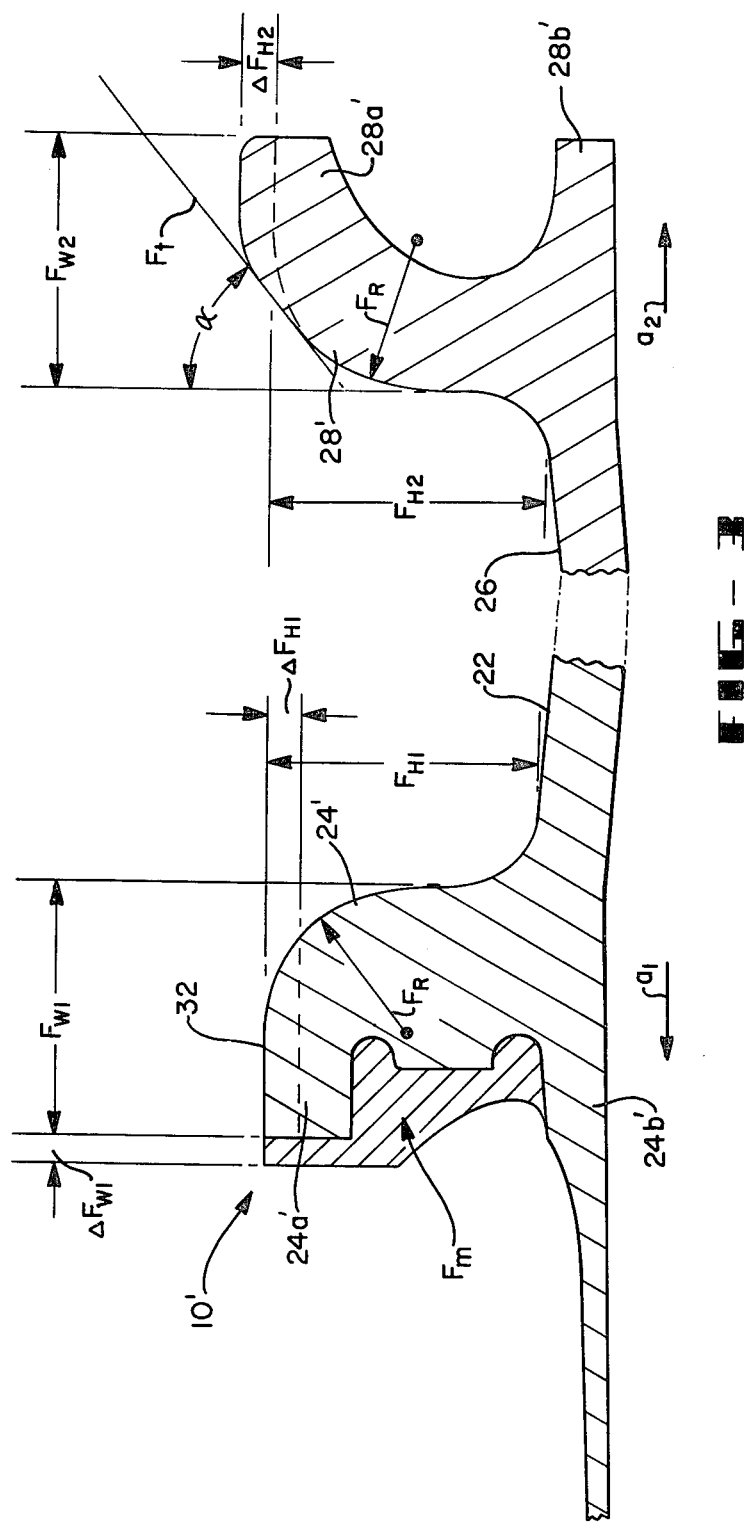
FIG. 3 is a partial elevational view, in section, of the wheel flanges of FIG. 2 further illustrating the inboard and outboard flange modifications.

Therefore, and referring now to FIGS. 2 and 3, this invention intends an aircraft wheel configuration that is substantially non-frangible when under load and rolling on it's flanges. This is accomplished by a distribution of the forces within the wheel structure such that the outboard and inboard flanges carry substantially the same load. The loading distribution, and thus the stress distribution, which herebefore was the cause of wheel fracture when concentrated in the inboard flange, is accomplished by increasing the outboard flange height $F_{H2}$ such that a predetermined differential flange height $\Delta F_H$ exists between the inboard and outboard flanges $24'$ and $28'$ respectively. Restructuring of the outboard flange $28'$ to effect a differential flange height $\Delta F_H$ may be accomplished by a number of techniques. For example, the wheel $10'$ may be made in an initial configuration wherein the outboard flange height contour is increased by $\Delta F_{H2}$ and thus $\Delta F_{H2} = \Delta F_H$. Alternatively, the wheel $10'$ may be forged or cast etc. in the usual manner of equal inboard and outboard flange heights ($F_{H1} = F_{H2}$) and upon completion thereof the inboard flange height $F_{H1}$ may be reduced $\Delta F_{H1}$ by machining etc. to the required $\Delta F_H$ as shown in FIG. 3. Or, a combination of the above-mentioned techniques may be applied wherein the wheel $10'$ is initially made with an incremental outboard flange height increase equal to $F_{H2} + \Delta F_{H2}'$ and thereafter the inboard flange $24'$ is machined to a flange height decrease of $F_{H1} - \Delta F_{H1}'$. In this example the incremental flange heights $\Delta F_{H1}' + \Delta F_{H2}' = \Delta F_H$, the required differential flange height established for the particular wheel.

Of course it will be recognized by persons knowledgeable in the wheel art that the contour of the outboard flange, upon incorporating the differential flange height $\Delta F_H$, is governed by standards of the Tire & Rim Association. In this circumstance, the interdependent wheel parameters of flange radius $F_R$ and flange height $F_H$ will be optimized for a particular wheel and tire and therefore a change in flange height $F_H$ must not affect these parameters. In this respect also the flange height contour incorporating $\Delta F_H$ is limited by a tangent $F_t$ to the flange radius $F_R$. The tangent $F_t$ intersects the vertical as drawn from the flange heel $F_h$ and forms a departure angle $\alpha$ that is established for a particular mounted tire. Therefore, the flange height $F_{H2} + \Delta F_{H2}$ has a contour bounded at the inboard extent by the tangent $F_t$ enclosing a minimum departure angle $\alpha$ as illustrated in FIG. 3.

An additional modification may be made to the wheel to further increase its structural integrity and this is effected in the inboard flange $24'$. As illustrated in the drawings, the modification amounts to increasing the inboard flange section modulus such that an increase in flange width $\Delta F_{W1}$ results and thus the roll surface 32 of the flange is increased. Various changes in the flange geometry may be made to accomplish an increased section modulus and the drawing shows but a single such configuration with the addition of material designated $F_m$. Regardless of the inboard flange geometry, it will be recognized by those knowledgeable in the art that the modification to the flange must be made in consideration of the overall weight distribution while achieving the intended results of increased flange integrity for the load to be applied.

In tests conducted with wheels employing the above-described wheel flange modifications, the following results were obtained. For a standard Douglas DC-10 production wheel, in the absence of an inflated tire, the wheel rolled approximately 710 feet when failure occurred. Upon increasing the inboard section modulus $F_m$ in an effort to strengthen the inboard flange, a similar wheel attained a distance of 8,160 feet when failure occurred. Finally, upon providing a differential flange height $\Delta F_H$ in conjunction with an increase in the inboard flange section modulus, a similar wheel rolled 28,352 feet before failure occured. Thus, the invention provides a marked improvement in the safe operation of an aircraft wheel when subjected to extraordinary conditions involving a deflated tire and when rolling at high speed on the wheel flanges.

While certain representative embodiments and details have been shown for the purpose of illustrating the invention, it will become apparent to those skilled in the art that various changes and/or modifications may be made therein without departing from the spirit or scope of the invention.

What is claimed is:

1. An improved aircraft wheel for mounting on a landing gear assembly associated with a landing gear strut, the wheel comprising inboard and outboard flanges forming bead seats for a mounted tire, the inboard and outboard directions of the wheel being with respect to the landing gear strut, the improvement comprising:
a differential flange height established between the inboard and outboard flanges such that the outboard flange height is greater than the inboard flange height by a predetermined amount, the differential flange height providing a substantially even distribution of the loading on the wheel flanges upon deflation of the mounted tire.

2. The improved wheel as set forth in claim 1 wherein the flange height differential is established in the outboard flange configuration.

3. The improved wheel as set forth in claim 1 wherein the flange height differential is established in the inboard flange configuration.

4. The improved wheel as set forth in claim 1 wherein the flange height differential is established by an increased outboard flange height configuration in combination with a reduced inboard flange height configuration.

5. The improved wheel as set forth in claim 1 wherein the differential flange height is bounded at the inboard extent by a tangent to the flange radius, which tangent describes a minimum angle as defined with respect to a vertical line drawn from the heel radius of the flange.

6. The improved wheel of claim 1 further comprising an increased inboard flange section modulus to increase the strength integrity of the inboard flange.

7. The improved wheel of claim 6 wherein the increased section modulus results in an increase in the inboard flange width to provide a broader roll surface to the flange.

8. An improved aircraft wheel having an inboard section and an outboard section interconnected to form an integral wheel structure for mounting a tire thereon, the inboard section comprised of a hub, a tubewell connected to the hub through a web structure and terminating in an inboard bead seat and an inboard flange having a flange height $F_{H1}$ and flange width $F_{w1}$, the outboard section comprised of an outboard bead seat terminating in an outboard flange having a flange height $F_{H2}$ and a flange width $F_{w2}$, the outboard bead seat connected in the inboard direction to the web structure, the improvement comprising:
an increased outboard flange height $F_{H2}$ such as to provide a differential flange height $\Delta F_H$ between the inboard and outboard flanges to effect load equalization on the wheel flanges upon deflation of the mounted tire and when rolling on a hard surface.

9. The improved wheel as set forth in claim 8 wherein $\Delta F_H$ is bounded at the inboard extent by a tangent to the flange radius $F_R$ that defines a minimum departure angle $\alpha$ with a vertical line drawn from the flange heel $F_h$.

10. The improved wheel as set forth in claim 8 further comprising an increased inboard flange section modulus.

11. The improved wheel as set forth in claim 10 wherein the increased section modulus results in an increase in the flange width $F_{w1}$.

12. The improved wheel as set forth in claim 8 wherein the differential flange height $\Delta F_H$ is attributed to an increases in the outboard flange height configuration by $\Delta F_{H2}$ such that $\Delta F_{H2} = \Delta F_H$.

13. The improved wheel as set forth in claim 8 wherein the differential flange height $\Delta F_H$ is attributed to a decrease in the inboard flange height configuration by $\Delta F_{H1}$ such that $\Delta F_{H1} = \Delta F_H$.

14. The improved wheel as set forth in claim 8 wherein the differential flange height $\Delta F_H$ is attributed to an increase in the outboard flange height configuration by $\Delta F_{H2}$ in combination with a decrease in the inboard flange height configuration by $\Delta F_{H1}$ such that the combined effect $\Delta F_{H2} + \Delta F_{H1} = \Delta F_H$.

* * * * *